United States Patent
Tiew et al.

(10) Patent No.: US 7,035,071 B1
(45) Date of Patent: Apr. 25, 2006

(54) CURRENT LIMIT WITH ADAPTIVE CYCLE SKIPPING FOR SWITCHING REGULATORS

(75) Inventors: Kee Chee Tiew, Richardson, TX (US); Thomas A. Schmidt, Murphy, TX (US); Brett E. Smith, McKinney, TX (US); John C. Vogt, Denton, TX (US); Abidur Rahman, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/025,706

(22) Filed: Dec. 29, 2004

(51) Int. Cl.
*H02H 9/08* (2006.01)

(52) U.S. Cl. ........................ 361/93.9; 700/33

(58) Field of Classification Search .................. 700/28, 700/32, 33; 361/93.9; 323/283, 284; 708/200
See application file for complete search history.

(56) References Cited

U.S. PATENT DOCUMENTS 6,882,918 B1 * 4/2005 Rose et al. .................... 701/54

* cited by examiner

*Primary Examiner*—Shawn Riley
(74) *Attorney, Agent, or Firm*—J. Dennis Moore; W. James Brady, III; Frederick J. Telecky, Jr.

(57) ABSTRACT

A switching regulator having a current limit with adaptive cycle skipping. A buck type switching regulator circuit is provided, including an energy storage component, such as an inductor or capacitor, and a switch for controllably providing an input current to the energy storage component. A control unit controls the on time and the off time of the switch by providing cyclically recurring control pulses to the switch that cause the switch to be on during the pulses and off otherwise. A current monitor circuit monitors a current corresponding to the input current applied to the energy storage component during the periodic control pulses. An overcurrent signal generator generates an overcurrent signal pulse upon detection of the monitored current at a level above a predetermined level corresponding to an overcurrent condition. A state machine responds to the overcurrent signal pulse and suppresses a number of the cyclically recurring control pulses, thereby controlling the period between the recurring control pulses that are not suppressed, in accordance with a predetermined algorithm that increases the number each time an overcurrent signal pulse is detected in successive periods.

10 Claims, 2 Drawing Sheets

CURRENT LIMIT WITH ADAPTIVE CYCLE SKIPPING FOR SWITCHING REGULATORS

TECHNICAL FIELD OF THE INVENTION

The present invention relates to switching power supply regulators, and more particularly relates to overcurrent detection in buck type regulators.

BACKGROUND OF THE INVENTION

Switching power supply regulators are widely used in the electronic arts, for example in battery management, because of their high efficiency. Such regulators convert a DC source at a reference voltage to a DC supply at a different voltage. The switching regulator uses an inductor, a transformer or a capacitor as an energy storage element to transfer energy from source to supply in discrete packets, defined by the ON and OFF times of a typically fixed frequency control signal CTL that controls the state of a switch. Feedback circuitry is typically used to maintain the supply voltage substantially constant, by adjusting the amount of ON time in accordance with load demands. One type of switching regulator is the buck regulator, which provides a DC supply voltage that is lower than the DC source voltage.

FIG. 1 is a diagram of an exemplary prior art buck switching regulator. In this regulator, an inductor L is the energy storage element. A capacitor C filters the output voltage $V_{OUT}$, providing a more constant voltage over time. A reference supply having a voltage $V_{SUPPLY}$ is provided as an input. FIG. 2 is a diagram of current through inductor L over time. The following description of the operation of the regulator of FIG. 1 is made with reference also to FIG. 2. Control of the circuit is by a pulse width modulated ("PWM") control signal.

In the ON phase, the control signal CTL from a control circuit 12 goes high, turning on transistor T1, and $V_{SUPPLY}$ is applied to the inductor L. At start-up, time $t_0$, $V_{OUT}$ starts at essentially zero volts. Thus the full $V_{SUPPLY}$ is asserted across the inductor L, and current begins to flow through it, increasing over time. This causes an electric field to build in the inductor L, representing energy being stored. The current $i_L$ flowing through inductor L during the ON phase is available for the load, and the additional current over the load current begins charging capacitor C.

In the OFF phase, for example starting at time $t_1$, CTL goes low, turning off transistor T1, and the supply voltage applied to the inductor L is removed. However, the current $i_L$ flowing in L cannot change instantaneously, so the voltage across L changes to maintain the current through L. Just as the current through L increased steadily during the ON, during the OFF phase it decreases steadily as the inductor field collapses. The current flowing through inductor L during the OFF phase is available for the load, and the additional current over the load current is available to charge capacitor C. The output voltage $V_{OUT}$ is provided to control circuit 12, which adjusts the relative ON and OFF times, i.e., the pulse width, of signal CTL to regulate the output voltage $V_{OUT}$ to a predetermined value $V_{SS}$. Once $V_{OUT}$ is stable, assuming a constant load, the relative ON and OFF times remain substantially the same. However, as the load changes, the circuit responds to restore/maintain $V_{OUT}$ to its target value $V_{SS}$.

Prior art regulators such as the one shown in FIG. 1 may not have the capability of detecting an overload or short circuit in the load. In such circumstances the output voltage drops below its average value during normal load conditions. The control circuit responds by increasing the ON time to supply more power in order to restore the output voltage to its target. However, supplying more power during a short circuit or overload condition may result in a catastrophic failure of the load circuit, and of the regulator circuit, as well Some prior art regulators are provided with current limiting circuits, to prevent excessive current flow during overload conditions. For example, as shown in FIG. 1, a resistor R is placed in parallel with the switching transistor T1, which is switched in and out of the circuit by way of a second switching transistor T2 that is controlled by the same control signal CTL that controls transistor T1. The size of transistor T2 is much larger than that of transistor T1 so that its impedance when ON is substantially less than that of transistor T1. The voltage across transistor T1 during the ON phase is thus monitored by resistor R. This voltage is sensed and amplified by a gain amplifier 14, the output of which is provided to the non-inverting input of a comparator 16. The inverting input of comparator 16 is connected to a reference voltage $V_{Ref}$ set to a value corresponding to an overcurrent condition of the regulator. The output of the comparator $OC_{Det}$ thus provides an indication of an overcurrent condition. Since overcurrent may occur in short spikes that are not damaging to the circuitry, the output of the comparator $OC_{Det}$ is filtered in a Deglitch circuit 18. The filtered output $I_{Det}$ of the Deglitch circuit 18 is used to determine if an overcurrent condition exists such that some measure should be taken to alleviate the overcurrent, such as the implementation of cycle skipping. In cycle skipping, the ON pulses of the control signal CTL are suppressed (skipped) for a preset number of cycles.

While cycle skipping provides some protection in overcurrent conditions, it has poor control on the output current in hard-short conditions, and the current may "run away," i.e., increase until catastrophic failure occurs in the circuitry. On the other hand, setting the number of cycles to be skipped when overcurrent is detected to too large a number could prevent the current regulator to start up in a soft-short condition, although it would resolve the current run away problem.

Thus, it would be desirable to have a switching regulator having effective overcurrent control in hard short conditions, while still allowing startup in soft short conditions. In this regard, while an analog current limit might be proposed to solve the problem, such a solution suggests a closed-loop system, which would need to be stabilized, presenting further problems.

SUMMARY OF THE INVENTION

The present invention provides a solution to the aforementioned problems, and provides a switching regulator having a current limit with adaptive cycle skipping. A buck type switching regulator circuit is provided, including an energy storage component, such as an inductor or capacitor, and a switch for controllably providing an input current to the energy storage component. A control unit controls the on time and the off time of the switch by providing cyclically recurring control pulses to the switch that cause the switch to be on during the pulses and off otherwise. A current monitor circuit monitors a current corresponding to the input current applied to the energy storage component during the periodic control pulses. An overcurrent signal generator generates an overcurrent signal pulse upon detection of the monitored current at a level above a predetermined level corresponding to an overcurrent condition. A state machine responds to the overcurrent signal pulse and suppresses a number of the cyclically recurring control pulses, thereby controlling the period between the recurring control pulses that are not suppressed, in accordance with a predetermined algorithm that increases the number each time an overcurrent signal pulse is detected in successive periods.

These and other aspects and features of the invention will be apparent to those skilled in the art from the following detailed description of the invention, taken together with the accompanying drawings.

DETAILED DESCRIPTION OF THE PREFERRED EMBODIMENTS

The present invention provides a switching regulator having an open-loop, digital overcurrent control system. The overcurrent control system of the present invention is capable of regulating the output current of the regulator below the desired level in both hard-short and soft-short conditions, and allows start-up even in soft short conditions. It is applicable to any switching regulator having buck functionality, such as a buck regulator or a buck-boost regulator, of which numerous configurations are known in the art.

Figure 1:
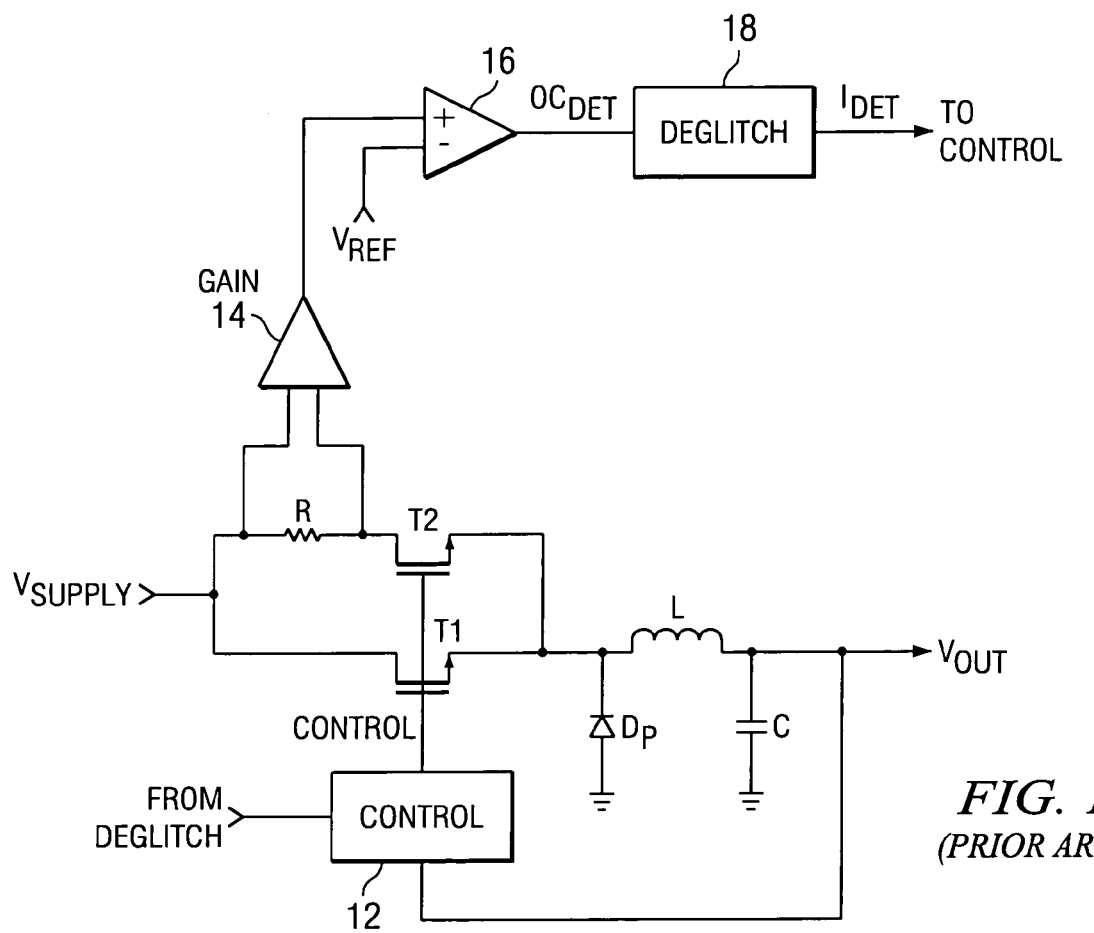
FIG. 1 is a diagram of a prior art buck type switching regulator.
Figure 2:
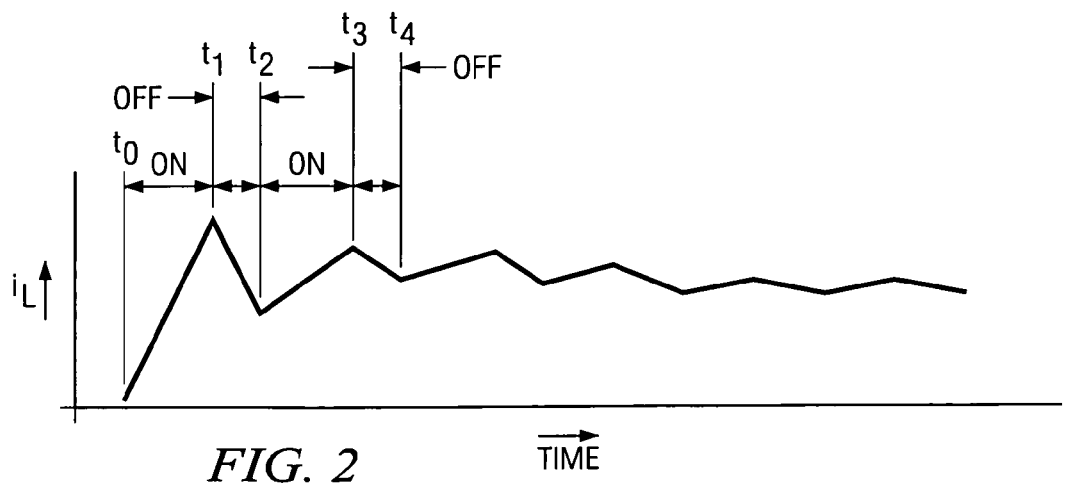
FIG. 2 is a diagram of a representative signal diagram of a typical buck type switching regulator.
Figure 3:
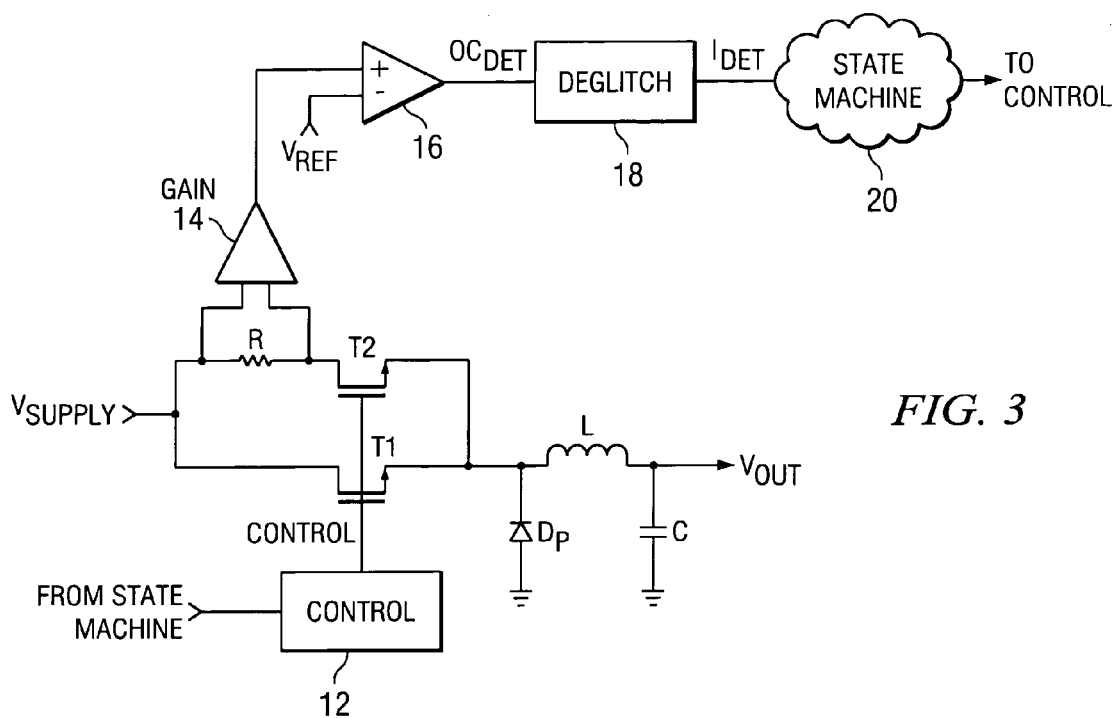
FIG. 3 is a diagram of an embodiment of the present invention.

FIG. 3 is a diagram of a preferred embodiment of the present invention. In this embodiment, a dynamic cycle-skipping system is provided that adjusts the duty cycle adaptively to prevent the inductor current from running away. This embodiment is similar to that of FIG. 1, with the exception that a state machine 20 is provided, that implements an algorithm according to the principles of the present invention. Components in FIG. 3 that are the same as those in FIG. 1 have the same reference identifiers, and in the interest of clarity their operation is not repeated here except as it aids in understanding the operation of the present invention. It will be understood, however, that the energy storage element is not limited to an inductor, but may be a capacitor or transformer, as well. Further, the particular arrangement shown in FIG. 3 for detecting an overcurrent condition and providing a signal indicative thereof is not intended to be limiting. Numerous other arrangements are known in the art, and all are considered to be within the scope of the claimed invention. Likewise, many arrangements of control units are known, and are also all considered to be within the scope of the claimed invention.

The inventive solution to the problem of runaway overcurrent may be better understood as follows. During the ON phase the following holds true:

$$\frac{V_{in} - V_{out}}{L} = \frac{dI_1}{dt_1} \qquad \text{Eq. 1}$$

while during the OFF phase the following holds true:

$$\frac{V_{out} + V_{diode}}{L} = \frac{dI_2}{dt_2} \qquad \text{Eq. 2}$$

where:

$V_{in}$ is the input voltage of inductor L, $V_{out}$ is the output voltage of inductor L, $V_{diode}$ is the voltage drop across diode $D_P$, $I_1$ is the current through inductor L during the ON phase, and $I_2$ is the current through inductor L during the OFF phase.

In order to maintain a condition where overcurrent is not running away, i.e., it is being controlled to remain within acceptable limits, in view of Eq. 1 and Eq. 2 it is therefore necessary to satisfy the following:

$$(V_{in} - V_{out})(dt_1) \leq (V_{out} + V_{diode})(dt_2) \qquad \text{Eq. 3}$$

Since there is a minimum ON time, the factor $dt_1$ has a minimum limit. However, since the phase control is by a fixed frequency signal, the factor $dt_2$ is limited, as well. In addition, $V_{out}$ can have any value within its range, and $V_{in}$ can likewise have any value within its range. Therefore, in order to preserve the inequality of Eq. 3 in a condition of ever increasing $V_{out}$, the present invention effectively increases $dt_2$ in accordance with novel adaptive principles. This will now be explained.

In this description, as a matter of nomenclature, the duration of a CTL cycle, at the clock frequency, is called a "cycle." When ON pulses are suppressed, the effective duration of the iteration of ON pulse and following OFF phase is extended beyond a cycle, and such extended iteration of ON phase and OFF phase is called a "period." Turning now to the explanation, when overcurrent is detected, by signal $I_{Det}$ going active, shortly after transistor T1 is turned on, this indicates that the current $I_L$ flowing in L does not have enough time to discharge. This triggers a cut-off of the remainder of the ON time for that cycle. If overcurrent is not detected in the next cycle, the operation of the circuit proceeds as in the prior art. However, when overcurrent is detected in two consecutive cycles, the inventive adaptive cycle skipping ("ACS") algorithm is applied by the state machine 20 to control the OFF times for CTL signal. According to this algorithm, the OFF time for the subsequent period is increased by a predetermined amount. If overcurrent is still detected at the beginning of the next ON phase CTL pulse that is allowed, the OFF time for the next period is increased by a still further amount. This process increases until $I_{Det}$ no longer goes active at the beginning of the next ON phase CTL pulse that is allowed.

It will be understood that the particular mechanism for detecting an overcurrent condition such that ACS is invoked is not critical. In the embodiment disclosed herein the mechanism is the detection of two consecutive $I_{Det}$ pulses. It could be a single such pulse. Other mechanisms are possible.

In addition, the particular ACS algorithms for increasing the OFF time for subsequent periods, i.e., for suppressing an increasing number of CTL pulses, may differ according to the desire of the designer. For example, the algorithm may be to increase in a binary pattern the number of pulses skipped. That is, the first number of skipped pulses would be one, the next would be two, the next after that four, the next after that eight, and so forth. Or, the algorithm may be a linear pattern. That is, each time the number of pulses to be skipped is incremented, it is done by a fixed number, such as one, two, three, or whatever number is desired by the designer. For example, if the number selected is two, the sequence of pulses skipped consecutively would be two, four, six, eight, and so forth. Or, the algorithm may be a logarithmic pattern. Other patterns may be readily conceived, and all such variations are considered within the scope of the invention.

It will be understood that the state machine 20 may be implemented in combinatorial logic, a gate array, in software, or in any combination of hardware and software. The only requirement of the state machine 20 is that it implement the algorithm described herein to control the ON time and OFF time of the CTL signal.

Figure 4:
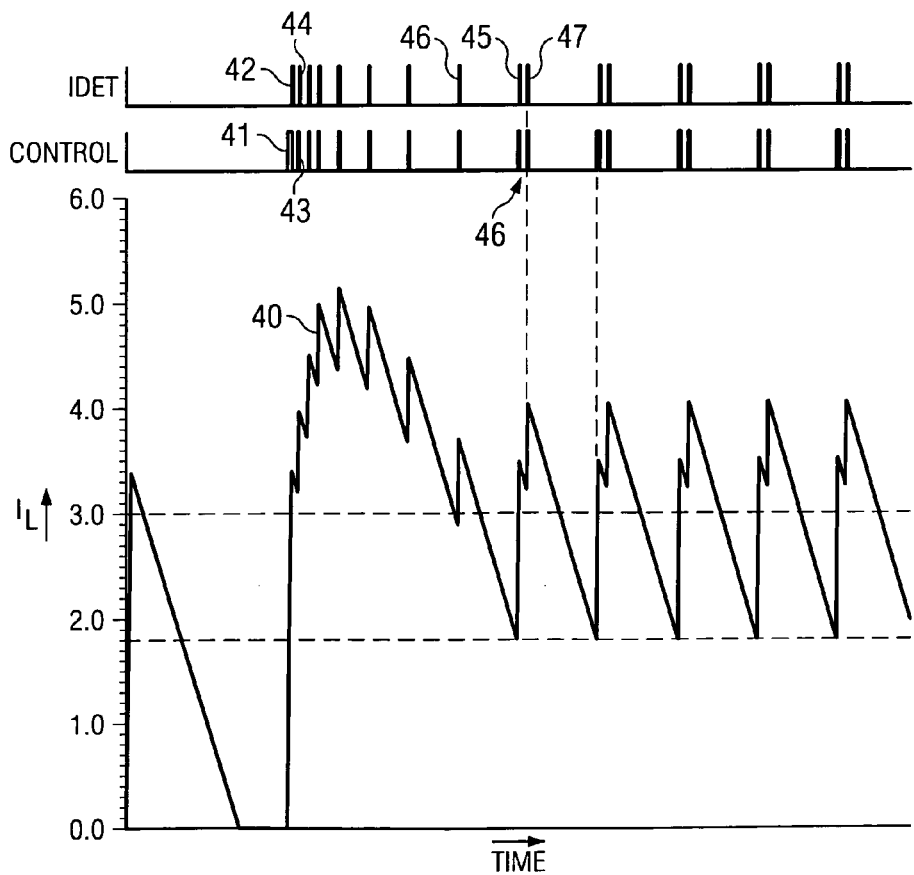
FIG. 4 is a graph of waveforms generated in the operation of the regulator of FIG. 3.

The result of the implementation of the above-described algorithm is illustrated in FIG. 4, which is a graph over time of various waveforms of signals generated in the operation of the regulator of FIG. 3 during a soft-short start-up. The top waveform in the figure is that of the signal $I_{Det}$, while the waveform below that is of the signal CTL. The waveform at the bottom of the figure is that of $I_L$. The overcurrent set point is 3 amps. At start-up 40, the first pulse 41 of CTL is asserted, establishing an ON phase, and the current $I_L$ rises during the pulse. Because of the soft-short condition, the current $I_L$ quickly exceeds the 3 amp overcurrent set point, causing a first pulse 42 of the signal $I_L$ to be generated. Since there is a slight delay in generating pulse 42, the current $I_L$ overshoots 3 amps before the overcurrent state machine 20 signals the control unit 12 to shut off transistor T1, i.e., to suppress the CTL pulse for the rest of its ON phase. The current $I_L$ decays slightly for the rest of this cycle. At the beginning of the next cycle, $I_L$ is still above 3 amps because the previous cycle did not provide enough OFF time for it to decay to a lower level. As a consequence, as soon as the CTL pulse 43 for this ON phase is asserted, a second pulse 44 of the signal $I_{Det}$ is generated. In response, the CTL pulse for the ON phase is immediately suppressed as before. This also satisfies the condition for the ACS algorithm of this embodiment to be applied by the state machine 20, which is recognized by the state machine 20. As a result, the first instance of skipping the CTL signal ON pulses occurs. In this embodiment the pattern for adaptive cycle skipping is binary. Thus, one ON phase pulse is skipped, i.e., the remainder of the current cycle continues with CTL OFF, and the next cycle keeps CTL OFF for the entire cycle, thus extending the period of ON phase and OFF phase to two cycles.

Note here that once ACS has been initiated, the state machine 20 has two OFF time values to select from: the normal OF time or the ACS OFF time. The state machine is programmed to select and apply the ACS OFF time whenever the ACS condition is met; otherwise the normal OFF time is selected and applied. The ACS OFF time is programmed to continue to increase according to the selected algorithm for such increase, discussed above, until the condition for ACS is no longer met, or until a preset maximum value for that OFF time is reached. The ACS OFF time is only reset if a switching period is completed without the generation of an $I_{Det}$ signal pulse. In the example shown in FIG. 4, it can be seen that the ACS condition is not met at the $9^{th}$ $I_{Det}$ signal pulse 45 because the current $I_L$ finally drops below 3 amps after the $8^{th}$ $I_{Det}$ signal pulse. When the ACS condition is no longer met, the state machine selects the normal OFF time. As can be seen, the OFF time 46 following the $9^{th}$ $I_{Det}$ signal pulse 45 is short, being the remainder of a cycle after the ON pulse. At the $10^{th}$ $I_{Det}$ signal pulse 47 it can be seen that the ACS condition is again met, because the previous OFF time was insufficient for the current $I_L$ to drop below the 3 amp overcurrent set point. Therefore, the ACS algorithm is again applied by the state machine 20. Thus, the ACS OFF time is first increased from its previous value according to the selected algorithm for such increase, discussed above, and once again selected and applied. A pre-set maximum ACS OFF time is reached after the $10^{th}$ $I_{Det}$ signal pulse 47, and so it no longer increases after that.

Although the present invention and its advantages have been described in detail, it should be understood that various changes, substitutions and alterations can be made herein without departing from the spirit and scope of the invention as defined by the appended claims.

What is claimed is:

1. A switching regulator having an adaptive current limit, comprising:
   a buck type switching regulator circuit, including an energy storage component and a switch for controllably providing an input current to the energy storage component;
   a control unit for controlling the on time and the off time of the switch by providing cyclically recurring control pulses to the switch that cause the switch to be on during the pulses and off otherwise;
   a current monitor circuit configured to monitor a current corresponding to the input current applied to the energy storage component during the periodic control pulses;
   an overcurrent signal generator configured to generate an overcurrent signal upon detection of the monitored current at a level above a predetermined level corresponding to an overcurrent condition;
   a state machine responsive to the overcurrent signal and configured to suppress a number of the cyclically recurring control pulses, and thereby control the period between the recurring control pulses that are not suppressed, in accordance with a predetermined algorithm that increases the number each time an overcurrent signal pulse is detected in successive periods.

2. A switching regulator as in claim 1, wherein the buck type switching regulator circuit is a buck regulator.

3. A switching regulator as in claim 1, wherein the buck type switching regulator circuit is a buck-boost regulator.

4. A switching regulator as in claim 1, wherein the control unit provides cyclically recurring control pulses that are pulse width modulated at a predetermined frequency.

5. A switching regulator as in claim 4, wherein the state machine is activated to suppress cycles when an overcurrent signal is detected in two consecutive occurrences of the control pulses.

6. A switching regulator as in claim 1, wherein the current monitor circuit monitors the voltage across a resistor connected in parallel with the switch.

7. A switching regulator as in claim 6, wherein the overcurrent signal generator generates the overcurrent signal when the voltage across the resistor exceeds a predetermined value corresponding to an overcurrent condition.

8. A switching regulator as in claim 1, wherein the predetermined algorithm is binary, such that the number of pulses suppressed in consecutive instances of detection of an overcurrent signal increases in a binary pattern.

9. A switching regulator as in claim 1, wherein the predetermined algorithm is linear, such that the number of pulses suppressed in consecutive instances of detection of an overcurrent signal increases in a linear pattern.

10. A method for current limiting a switching regulator having an energy storage component and a switch for controllably providing an input current to the energy storage component, a control unit for controlling the on time and the off time of the switch by providing cyclically recurring control pulses to the switch that cause the switch to be on during the pulses and off otherwise, a current monitor circuit configured to monitor a current corresponding to the input current applied to the energy storage component during the periodic control pulses, and an overcurrent signal generator configured to generate an overcurrent signal upon detection of the monitored current at a level above a predetermined level corresponding to an overcurrent condition, comprising the steps of:

detecting an overcurrent signal; and in response to the detected overcurrent signal, suppressing a number of the cyclically recurring control pulses, and thereby controling the period between the recurring control pulses that are not suppressed, in accordance with a predetermined algorithm that increases the number each time an overcurrent signal pulse is detected in successive periods.

* * * * *